(12) United States Patent
Roh et al.

(10) Patent No.: US 8,259,863 B2
(45) Date of Patent: Sep. 4, 2012

(54) METHOD FOR TRANSMITTING AND DECODING SIGNALS CONSIDERING REPEATEDLY TRANSMITTED INFORMATION

(75) Inventors: Dong Wook Roh, Gyeonggi-do (KR); Yu Jin Noh, Gyeonggi-do (KR); Dae Won Lee, Gyeonggi-do (KR); Ki Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 770 days.

(21) Appl. No.: 12/361,384

(22) Filed: Jan. 28, 2009

(65) Prior Publication Data

US 2009/0225906 A1 Sep. 10, 2009

Related U.S. Application Data

(60) Provisional application No. 61/024,192, filed on Jan. 28, 2008.

(30) Foreign Application Priority Data

Jul. 29, 2008 (KR) .................. 10-2008-0074126

(51) Int. Cl.
*H04L 27/04* (2006.01)

(52) U.S. Cl. ........ 375/340; 375/343; 375/341; 375/267; 375/295; 714/777; 714/781

(58) Field of Classification Search .................. 375/340, 375/341, 343, 295, 267; 714/777, 781
See application file for complete search history.

(56) References Cited

U.S. PATENT DOCUMENTS

| 4,933,956 | A | * | 6/1990 | Forney, Jr. | 375/341 |
| 2004/0123223 | A1 | * | 6/2004 | Halford | 714/781 |
| 2008/0002780 | A1 | * | 1/2008 | Yu et al. | 375/267 |
| 2010/0031124 | A1 | * | 2/2010 | Shinagawa et al. | 714/777 |
| 2010/0316161 | A1 | * | 12/2010 | Kim et al. | 375/295 |
| 2011/0142023 | A1 | * | 6/2011 | Aoki et al. | 370/338 |
| 2011/0150148 | A1 | * | 6/2011 | Son et al. | 375/343 |

* cited by examiner

*Primary Examiner* — Eva Puente
(74) *Attorney, Agent, or Firm* — Lee, Hong, Degerman, Kang & Waimey (57) ABSTRACT

Signal transmitting and decoding methods considering repeatedly transmitted information in transmitting informations in various types are disclosed. Both a first type information varying with a long period and a second type information varying with a short period are simultaneously transmitted by a same period. A receiving side receiving these informations is able to perform fast decoding by unmasking the corresponding information prior to decoding of a next received signal after obtaining the first type information in a manner of considering a fact that the first type information is repeatedly transmitted for a prescribed period of time.

9 Claims, 6 Drawing Sheets

METHOD FOR TRANSMITTING AND DECODING SIGNALS CONSIDERING REPEATEDLY TRANSMITTED INFORMATION

CROSS-REFERENCE TO RELATED APPLICATIONS

Pursuant to 35 U.S.C. 119, this application claims the benefit of earlier filing date and priority to Korean Patent Application No. 10-2008-0074126, filed on Jul. 29, 2008, and also claims the benefit of U.S. Provisional Application Ser. No. 61/024,192, filed on Jan. 28, 2008, the contents of which are all hereby incorporated by reference herein in their entirety.

BACKGROUND OF THE INVENTION

1. Field of the Invention

The present invention relates to information encoding and/or decoding in a mobile communication system, and more particularly, to a method of decoding a received signal efficiently by considering information that is repeatedly transmitted or varies with a long period.

2. Discussion of the Related Art

First of all, contents of basic coding theories necessary for the description of the present invention are explained as follows.

Assuming that a general binary error correction code is represented as [n, k, d], 'n' indicates the bit number of coded codeword, 'k' indicates the information bit number before coding, and 'd' indicates a minimum value among inter-codeword distances. Since the code is binary, a code length of codeword is $2^n$ and the total number of coded codewords becomes $2^k$.

For convenience, if a minimum distance does not matter considerably, the binary error correction code can be represented as [n, k]. In the following description, unless there is special mention, a value indicated by n, k and d shall be fixed to the above contents. In this case, a code rate R is defined as a value resulting from dividing the information bit number by the bit number. Namely, the code rate R is defined as $R=k/n$.

In the following description, Hamming distance in coding theory is explained. Hamming distance means the number of non-matched bit values corresponding to each other between binary codes having the same bit number. If Hamming distance d is represented as $d=2a+1$, it is able to correct errors amounting to the number 'a'. For instance, if two codewords are '101011' and '110010', Hamming distance between the two codewords is 3.

Meanwhile, a minimum distance means a minimum value of a distance between random two codewords belonging to the code. The minimum distance is one of important estimated quantities indicating a good extent of code. And, the above-mentioned Hamming distance is used as a distance. The minimum distance is widely used as an index for estimating performance o general codes. In particular, as a distance between codewords generated through a coding process gets greater, it becomes less probable that a corresponding codeword is determined as a different codeword. Hence, coding performance becomes better. And, entire code performance is estimated by a distance between codewords having worst performance, i.e., a minimum distance between codewords. Consequently, a good code having a minimum distance maximized shows good performance.

In the next generation mobile communication system, control information is very important in determining performance of system by carrying information of system configuration, transport channel and the like. The control information is configured to have a short length to use system resources as small as possible. The control information is coded by coding scheme strong against channel error and is then transmitted. For instance, in the 3GPP mobile communication system, coding scheme for control information adopts a block code of short length based on RM code, tail-biting convolutional code, repeated code of simplex code or the like.

Meanwhile, the above-mentioned control information can be categorized into information slowly varying with a long period and information for carrying different information at each transport timing point with a short period. In case that both of the informations differing from each other in type need to be simultaneously transported, a receiving side is able to use information in a manner of efficiently decoding a received signal using a fact that specific information is repeated for a prescribed period to carry the same information. Yet, this scheme has not been discussed in detail.

DISCLOSURE OF THE INVENTION

Technical Problem

Accordingly, the present invention is directed to a method for transmitting and decoding signals considering repeatedly transmitted information which substantially obviates one or more of the problems due to limitations and disadvantages of the related art.

An object of the present invention is to provide an effective coding method for a case that different transmission periods and different reliabilities are required for transmitting various kinds of information. IN particular, when different kinds of informations are coded and transmitted, the present invention proposes a method of enhancing reliability by repeatedly transmitting common information in part.

Another object of the present invention is to provide a method of performing fast decoding efficiently in decoding repeatedly transmitted common information by obtaining repeatedly transmitted information in entire received signals in advance and then using the obtained information for decoding of a next received signal.

Another object of the present invention is to provide a decoding method for enhancing reliability of common information by combining a part corresponding to the common information within a prescribed repetition section to raise reliability and then decoding the common information obtained by the combination.

A further object of the present invention is to provide a method of raising reliability of a received signal and enhancing decoding performance by setting a timing point for actually applying a repeatedly transmitted common code to a predetermined offset from the beginning of a repetition section.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, a decoding method, in which a receiving side receives and decodes a first type information varying with a first period longer than a prescribed reference and a second type information varying with a second period shorter than the prescribed reference, includes a first receiving step of receiving the first type information and the second type information, a first decoding step of decoding the first type information and the second type information received in the first receiving step, a second receiving step of after duration of a prescribed time unit, receiving the first type information and the second type information again, and a second decoding step of decoding the first type information and the second type information received in the second receiving step, wherein if the prescribed time is shorter than the first period, after decoding of the first type information received in the second receiving step is omitted on the assumption that a decoding result of the first type information received in the second receiving step is equal to that of the first type information received in the first receiving step, the second type information received in the second receiving step is decoded only.

Preferably, a transmitting side codes both of the first and second type informations by a prescribed block coding scheme and then transmits the coded informations to the receiving side and the transmitting side performs coding in a manner that the second type information and the first type information are set to be sequentially coded to correspond to a left basis sequence of a code generation matrix for the prescribed block coding in order of the second type information to the first type information.

More preferably, the code generation matrix for the prescribed block coding includes a generation matrix having a characteristic that a Hamming distance between generated codewords is equal or increases if the number of basis sequences used for the coding gets smaller from the basis sequence located at a most left side.

Preferably, the first receiving step and the first decoding step are consecutively repeated as many as a prescribed count and the decoding result of the first type information used in the second decoding step is obtained from combining the decoding results of the first type information in the first decoding step repeated as many as the prescribed count.

More preferably, the decoding method further includes the step of interpreting the decoding result of the first type information generated from the first or second decoding step and the decoding result of the second type information generated from the first or second decoding step by linking the decoding results together, wherein the decoding result of the first type information is interpreted with a prescribed offset by being linked with the decoding result of the second type.

In this case, the prescribed offset corresponds to a time taken for repeating the first receiving step and the first decoding step as many as the prescribed count.

To further achieve these and other advantages and in accordance with the purpose of the present invention, a decoding method, in which a receiving side receives and decodes a first type information corresponding to the same information received at receiving timing points amounting to a prescribed count and a second type information corresponding to information different at each receiving timing point, includes the steps of receiving the first type information and the second type information and decoding the first type information and the second type information, wherein after decoding of the first type information received in the receiving step is omitted on the assumption that a decoding result of the first type information received in the receiving step is equal to that of the first type information received in a previous receiving step, the second type information received in the receiving step is decoded only.

Preferably, a transmitting side codes both of the first and second type informations by a prescribed block coding scheme and then transmits the coded informations to the receiving side and the transmitting side performs coding in a manner that the second type information and the first type information are set to be sequentially coded to correspond to a left basis sequence of a code generation matrix for the prescribed block coding in order of the second type information to the first type information.

To further achieve these and other advantages and in accordance with the purpose of the present invention, an information transmitting method, in which a transmitting side codes and transmits a first type information varying with a first period longer than a prescribed reference and a second type information varying with a second period shorter than the prescribed reference, includes the steps of generating the first type information and the second type information into a single information bitstream, generating a codeword by coding the information bitstream by a prescribed coding scheme, and transmitting the codeword to a receiving side, wherein the prescribed coding scheme is characterized in that a minimum Hamming distance of the generated codeword is equal or increases if the bit number of the information bitstream decreases.

Preferably, the prescribed coding scheme includes a block coding scheme. And, in the block coding scheme, the information bitstream is made to sequentially correspond to a left basis sequence of a code generation matrix for the prescribed block coding in order of a bit corresponding to the second type information to a bit corresponding to the first type information.

Preferably, in generating the first and second type informations constructing the information bitstream, by taking a time for constructing the information bitstream as a reference time, the second type information is coded using information generated at the reference time and the first type information is generated from coding using the first type information generated prior to a previous corresponding time with a prescribed offset from the reference time.

It is to be understood that both the foregoing general description and the following detailed description are exemplary and explanatory and are intended to provide further explanation of the invention as claimed.

Advantageous Effects

According to the above-mentioned embodiments of the present invention, it is able to efficiently transmit information in various types. In particular, fast decoding is enabled using a characteristic that specific information is repeatedly transmitted while high reliability is maintained.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

First of all, the following detailed description disclosed together with the accompanying drawings is intended not to indicate a unique embodiment of the present invention but to represent an exemplary embodiment of the present invention. For instance, the following description takes a detailed example applied to the 3GPP LTE system to help the understanding. Yet, the present invention is applicable to every communication system, for which transmission of different type information is generally required, as well as the 3GPP LTE system.

The following description is applicable to both uplink and downlink. In the following description, 'base station; means a fixed station communicating with a user equipment in general and can be called such a different terminology as a node-B, a BTS (base transceiver system), an access point and the like. In this case, the 'user equipment' is a random subject that is fixed or can have mobility. And, the 'user equipment' can be called such a random terminology as a terminal, a user terminal (UT), an SS (subscriber station), a wireless device and the like.

The following detailed description includes details to provide the full understanding of the present invention. And, it is apparent to those skilled in the art that the present invention can be implemented without the details. In some cases, the structures and devices known to public are omitted to avoid the conceptional vagueness of the present invention or are depicted as block diagrams centering on core functions of the structures and devices. Wherever possible, the same reference numbers will be used throughout the drawings to refer to the same or like parts.

The following description provides a method of efficiently coding and transmitting informations in various types, for which different transmission periods and different reliabilities are required, respectively, and decoding the corresponding information efficiently in a receiving side.

In the following description, a method of transmitting informations in various types varying with various periods is explained.

First of all, in transmitting information, there may be a case that informations in various types are put together and then transmitted via one path. For instance, if 3GPP LTE system is taken as an example, channel quality relevant information of control channel information, which includes a signal to interference noise ration (SINR), a rank indicator (RI), a preceding matrix index (PMI) and the like, can be transmitted in uplink. Thus, each information transmitted via the same path may have a different varying period and may have a different reliability.

The following description is made on the assumption that a case of transmitting informations in various types via the same path is generalized into a case of transmitting informations in two kinds of types via the same path within a range of maintaining generality. In particular, assume that information in one type (first type information) is the information varying with a long period and assume that information in the other type (second type information) is information varying with a short period. If uplink of the 3GPP LTE system is taken as an example, RI is the information varying slow with a long period but SINR is information varying fast. Moreover, PMIT varies faster than RI but is the information varying slower than SINR.

Therefore, the following description is made on the assumption that the first type information and the second type information in the above example are in relative relation between informations in various types rather than they correspond to the RI and the SINR, respectively.

Figure 1:
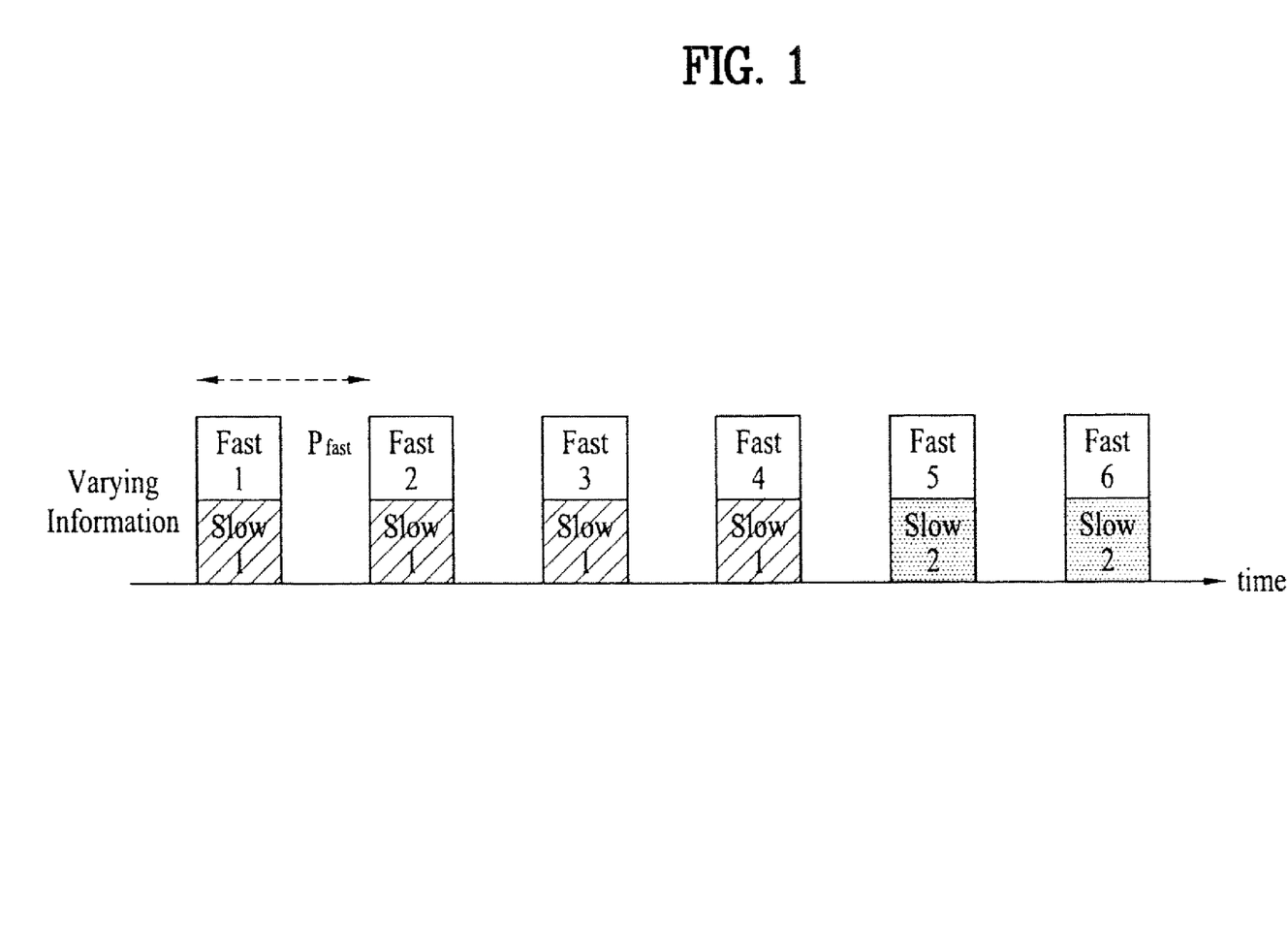
FIG. 1 is a diagram for explaining the concept that information varying with a long period and information varying with a short period are transmitted via the same path.

FIG. 1 is a diagram for explaining the concept that information varying with a long period and information varying with a short period are transmitted via the same path.

Referring to FIG. 1, 'Fast' indicates information in a type varying with a short period and 'Slow' indicates information in a type varying with a long period. Assume that '$P_{fast}$' indicates a varying period of information in a type varying with a short period. Numeral below each transmission information is a mark for discriminating whether corresponding information is the same information or modified information. Information in a type varying with a fast period is transmitted in a manner that different information is transmitted at each transmission timing point. Information in a type varying with a slow period is transmitted in a manner that the same information is repeatedly transmitted at each fourth transmission timing point.

As observed from FIG. 1, although information varies with various varying periods, a real transmission should be performed to keep up with the $P_{fast}$ that is the period of the fastest varying information. Hence, a complete information transmission is possible.

Yet, considering efficiency of an information transmission in a specific system only, it may be possible to consider a case that slow varying information is intermittently transmitted to match a varying period instead of being transmitted every time.

Figure 2:
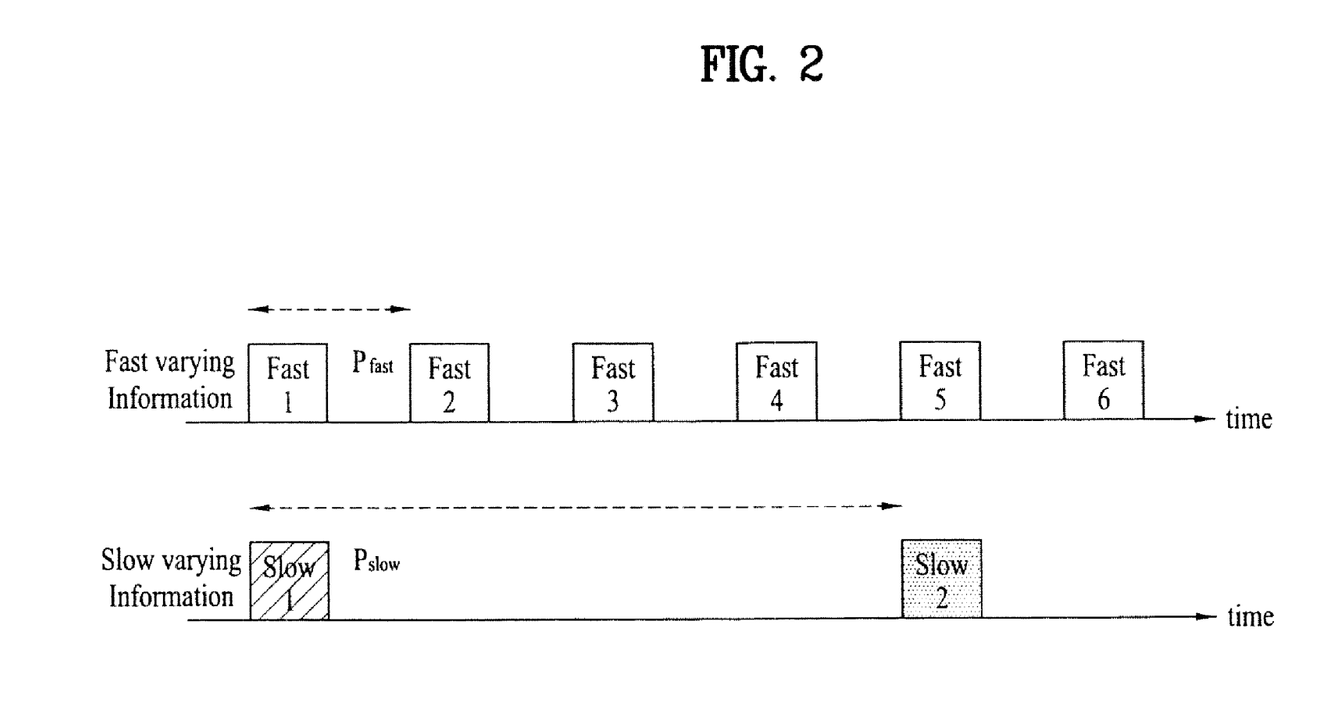
FIG. 2 is a diagram for explaining the concept that information varying with a long period and information varying with a short period are transmitted via different paths, respectively.

FIG. 2 is a diagram for explaining the concept that information varying with a long period and information varying with a short period are transmitted via different paths, respectively.

In this system, fast varying information is transmitted by a period $P_{fast}$ that is a fast period. Slow varying information can be slowly transmitted by a great period $P_{slow}$.

Yet, in a specific system, there may be a case that the above-mentioned informations in various types are usable only if they are linked together. For instance, in MIMO system using a multi-antenna, as mentioned in the foregoing description, the RI, PMI and SINR correspondent informations and the like should be linked together to enable a transmitting side to perform channel adaptation efficiently. In this system, if each information is transmitted as shown in FIG. 2, it is advantageous in aspect of transmission efficiency. Yet, if error is generated from slow varying information received at a specific timing point, it is disadvantageous that fast varying information transmitted later is not usable as well. Namely, error propagation is generated.

In the following description, in order to eliminate the above-mentioned error propagation, assume that the transmission scheme shown in FIG. 1 for transmitting all the informations simultaneously in each transmission is adopted.

Yet, if the transmission scheme shown in FIG. 1 is adopted, slow varying information is transmitted in each transmission so that a transmission space, a transmission power or the like, which can be allocated to fast varying information, may be wasted. Hence, it is disadvantageous in that reception performance of the fast varying information is degraded. To overcome this disadvantage, one embodiment of the present invention proposes a method of transmitting informations in various types by combination with an effective coding scheme and receiving to decode the informations efficiently.

First of all, a method of transmitting several informations varying with different periods by considering all the coding schemes so far is explained as follows. As an example of a coding scheme, the following block coding scheme is looked into.

For the detailed explanation, formulas are used as follows. First of all, k information bits $a_0, a_1, \ldots a_k$ (LSB from $a_0$) are sequentially inputted to a coding module using block coding of Table 1. A column to which information bit fails to correspond is considered as corresponding to 0 (zero). In this case, an $i^{th}$ bit $b_i$ of an output codeword can be calculated as follows.

$$b_i = \sum_{n=0}^{9} (\alpha_n \times M_{i,n}) \bmod 2 \text{ where } i = 0, \ldots, 31.$$

Block code based on Table 1 can be considered in a format that a 20-bit basis sequence is masked on information bit each time the information bit is added. Hence, if a receiving side already knows a specific bit in decoding the received information, the receiving side cancels off the masking effect by the corresponding bit in a manner of performing XOR (exclusive OR) operation on a received signal by a corresponding basis sequence. Therefore, it is able to obtain an effect that the number of the received bits is reduced by the already-known bit number.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ | $M_{i,13}$ |
|---|---|---|---|---|---|---|---|---|---|---|---|---|---|---|
| 0 | 1 | 1 | 0 | 0 | 0 | 0 | 0 | 0 | 0 | 0 | 1 | 1 | 0 | 0 |
| 1 | 1 | 1 | 1 | 0 | 0 | 0 | 0 | 0 | 0 | 1 | 1 | 1 | 0 | 0 |
| 2 | 1 | 0 | 0 | 1 | 0 | 0 | 1 | 0 | 1 | 1 | 1 | 1 | 1 | 1 |
| 3 | 1 | 0 | 1 | 1 | 0 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 | 1 |
| 5 | 1 | 1 | 0 | 0 | 1 | 0 | 1 | 1 | 1 | 0 | 1 | 1 | 1 | 0 |
| 6 | 1 | 0 | 1 | 0 | 1 | 0 | 1 | 0 | 1 | 1 | 1 | 1 | 1 | 0 |
| 7 | 1 | 0 | 0 | 1 | 1 | 0 | 0 | 1 | 1 | 0 | 1 | 1 | 1 | 1 |
| 8 | 1 | 1 | 0 | 1 | 1 | 0 | 0 | 1 | 0 | 1 | 1 | 1 | 1 | 1 |
| 9 | 1 | 0 | 1 | 1 | 1 | 0 | 1 | 0 | 0 | 1 | 1 | 1 | 1 | 1 |
| 10 | 1 | 0 | 1 | 0 | 0 | 1 | 1 | 1 | 0 | 1 | 1 | 1 | 1 | 1 |
| 11 | 1 | 1 | 1 | 0 | 0 | 1 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 | 1 |
| 13 | 1 | 1 | 0 | 1 | 0 | 1 | 0 | 1 | 0 | 1 | 1 | 1 | 1 | 1 |
| 14 | 1 | 0 | 0 | 0 | 1 | 1 | 0 | 1 | 0 | 0 | 1 | 0 | 1 | 1 |
| 15 | 1 | 1 | 0 | 0 | 1 | 1 | 1 | 1 | 0 | 1 | 1 | 0 | 1 | 1 |
| 16 | 1 | 1 | 1 | 0 | 1 | 1 | 0 | 0 | 1 | 0 | 1 | 1 | 1 | 1 |
| 17 | 1 | 0 | 0 | 1 | 1 | 1 | 0 | 0 | 1 | 0 | 0 | 1 | 1 | 1 |
| 18 | 1 | 1 | 0 | 1 | 1 | 1 | 1 | 1 | 0 | 0 | 0 | 0 | 0 | 1 |
| 19 | 1 | 0 | 0 | 0 | 0 | 1 | 1 | 0 | 0 | 0 | 0 | 0 | 0 | 1 |

Table 1 can represent a code generation matrix used for 20-bit length codeword generation in case that information bits are maximum 14 bits in (20, k) type block coding. In this case, (A, B) indicates that a code generation matrix used for block coding scheme is constructed with A rows and B columns. In Table 1, $M_{i,0}$ to $M_{i,13}$ can be named a basis sequence. If the information bit number corresponds to k bits, k basis sequences from a left side are used for a coding process of information bits.

In particular, information bits correspond to each column in Table 1. And, a corresponding order follows LSB (least significant bit) from a left side. Namely, if information bits correspond to 4 bits, four columns from the left side are used to correspond to four columns of $[M_{i,0} \, M_{i,1} \, M_{i,2} \, M_{i,3}]$ only. In this case, each coded bit corresponds to LSB from an upper row. Namely, information bits correspond to columns in Table 1 as many as a length of the information bits. And, a coding process is obtained by performing a binary operation of multiplying the respective values of a basis sequence of a column unit by corresponding information bits.

Meanwhile, the block coding scheme of Table 1 corresponds to one of coding schemes considered for coding of control channel by the 3GPP LTE system and is characterized in that a maximum minimum distance of code is increased if information bits are decreased. In particular, in case that the block coding scheme according to Table 1 is used, a maximum minimum distance according to an information bit length can be represented as follows.

TABLE 2

| k | 4 | 5 | 6 | 7 | 8 | 9 | 10 | 11 | 12 | 13 | 14 |
|---|---|---|---|---|---|---|---|---|---|---|---|
| $d_{min}$ | 8 | 8 | 8 | 6 | 6 | 6 | 6 | 4 | 4 | 4 | 4 |

In Table 2, 'k' indicates an information bit number inputted to a block coding module and '$d_{min}$' indicates a minimum Hamming distance. Namely, in Table 2, if the information bit number corresponds to 6 bits or less, a minimum distance is 8. If the information bit number corresponds to 10 bits or less, a minimum distance is 6. If the information bit number exceeds 10, a minimum distance is 4. Hence, it can be observed that the minimum distance also decreases if the information bit number increases.

Meanwhile, assume that the block code of Table 1 is used for the example of FIG. 1, assume that a size of information varying with a fast period corresponds to 10 bits each time, and assume that a size of information varying with a slow period corresponds to 2 bits. If so, a size of information to be eventually transmitted corresponds to 12 bits. Hence, a minimum distance is 4 according to Table 2.

Assume that a receiving side already knows the 2 bits corresponding to the information varying with the slow period among the transmission bits. If the receiving side performs unmasking on the already-known 2-bit information in the first place, it brings an effect that the transmitted bits correspond to 10 bits instead of 12 bits. Hence, the minimum distance increases to 6 from 4, whereby coding performance is enhanced.

A transmission method for using the advantage of the minimum distance increase effectively is explained in detail as follows.

First of all, slow varying information is transmitted for a corresponding update period $P_{slow}$ in a manner that the same information is repeatedly transmitted each time to match an update period $P_{fast}$ of fast varying information. And, the fast varying information is transmitted in each transmission period together with the slow varying information as well. In this case, a coding scheme used for the transmissions of the above informations supports lengths of various information bits and changes performance of code according to the corresponding information bit length. In particular, the coding scheme in the method according to the present embodiment is not necessarily limited to the block coding scheme according to Table 1. And, it is able to use a random coding scheme characterized in that a minimum Hamming distance increases between generated codewords in inverse proportion to the number of inputted information bits. Namely, the present embodiment uses a random coding scheme that enhances error correction capability if the information bit length decreases.

Yet, the transmission method according to the present embodiment assumes that the information having the same length is transmitted in each transmission by including both of the fast varying information and the slow varying information.

Figure 3:
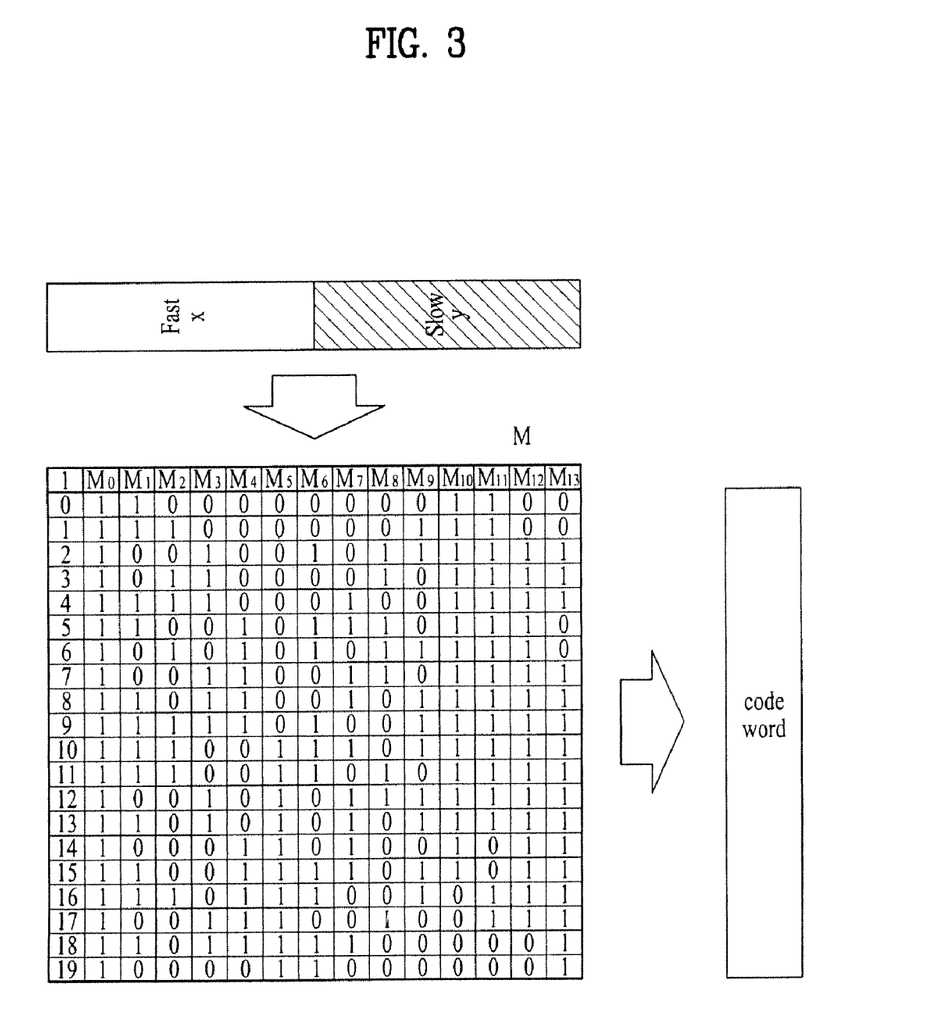
FIG. 3 is a diagram for explaining the concept that information in a type having a fast varying period and information in a type having a slow varying period are coded together and transmitted according to one embodiment of the present invention.

FIG. 3 is a diagram for explaining the concept that information in a type having a fast varying period and information in a type having a slow varying period are coded together and transmitted according to one embodiment of the present invention.

In FIG. 3, fast varying information is represented as 'Fast x' and slow varying information is represented as 'Slow y'. And, both of them are connected together in series to perform block coding. A correspondingly generated codeword is then transmitted to a receiving side. If a size of information transmitted each time is constant, it is advantageous in that coding scheme and transmission format are simplified.

In order to use the advantages of the minimum distance increase in association with Table 2 effectively, a receiving method according to one embodiment of the present invention is explained in detail as follows.

Figure 4:
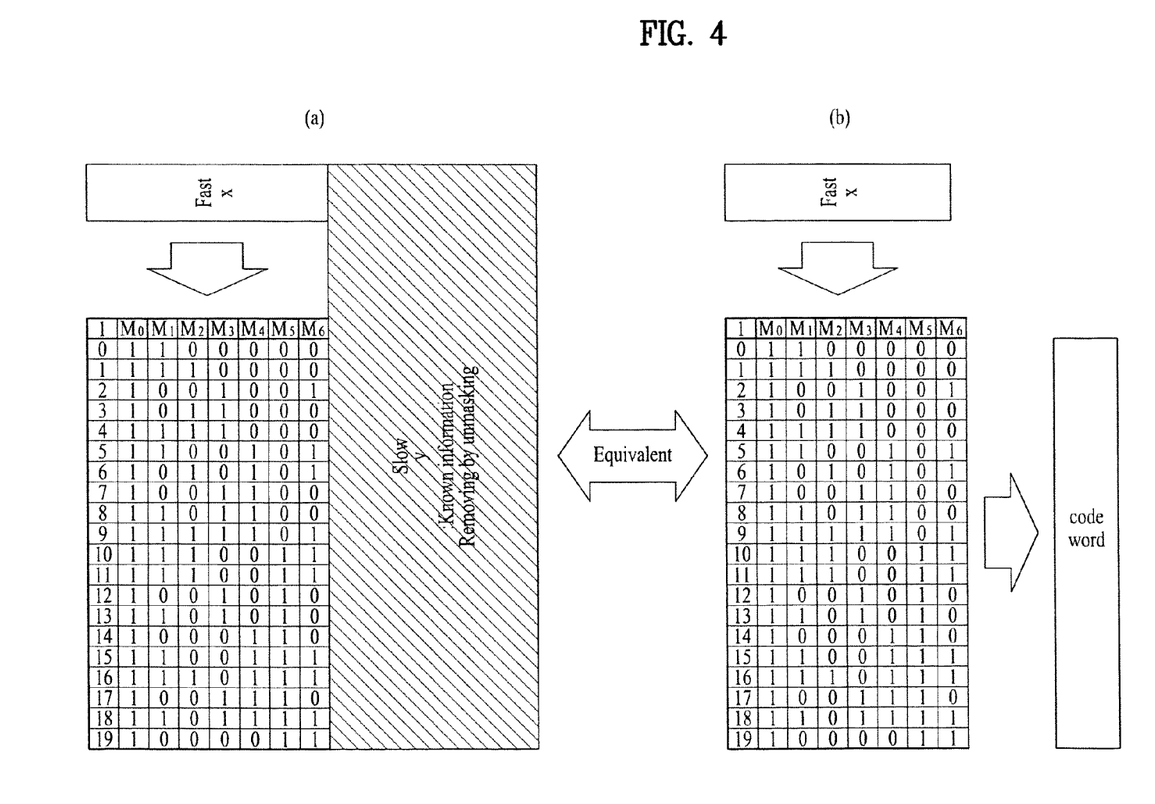
FIG. 4 is a diagram for explaining a method of enhancing decoding performance of a received signal according to one embodiment of the present invention.

FIG. 4 is a diagram for explaining a method of enhancing decoding performance of a received signal according to one embodiment of the present invention.

Referring to FIG. 4, after slow varying information has been decoded, a receiving side performs unmasking on the already-known slow carrying information in a signal received in a next reception within a range of an update period $P_{slow}$ of the slow varying information. This process is indicated by (a) on a left part of FIG. 4. Thus, if the already-known information is unmasked, it brings an effect as if the bit number of real transmission information decreases. This is indicated by (b) on a right part of FIG. 4.

The above-explained signal decoding method according to the present embodiment proposes to decode the fast varying information efficiently by removing the influence caused by the slow varying information from the whole received signal. According to the present embodiment, it brings an effect that the valid transmission bit number, which corresponds to a case that the receiving side already knew the information in part, decreases.

Meanwhile, let's look into an example for a case that fast and slow varying bit numbers are 12 and 2, respectively. Since the present example corresponds to a case that total information bit number is 14, a minimum distance according to Table 2 becomes 4. In this case, if a receiving side decodes slow varying information and then unmasks it, the valid transmission information bit number corresponds to 12 bits. In such a special example, the minimum distance is 4 to make no difference even if the unmasking is used. In other words, it is advantageous in that slow varying information bits can be repeatedly together without performance degradation of fast varying information by the above-mentioned transmission scheme. Namely, by the above-mentioned transmission scheme according to the embodiment of the present invention, it is advantageous in that the transmission bit number can be increased without performance degradation in specific case.

Assuming a case that slow varying information is uncertain, another embodiment of the present invention considers a case of raising reliability of the slow varying information by a method of receiving the slow varying information several times, combining the received informations together and then making a decision.

Figure 5:
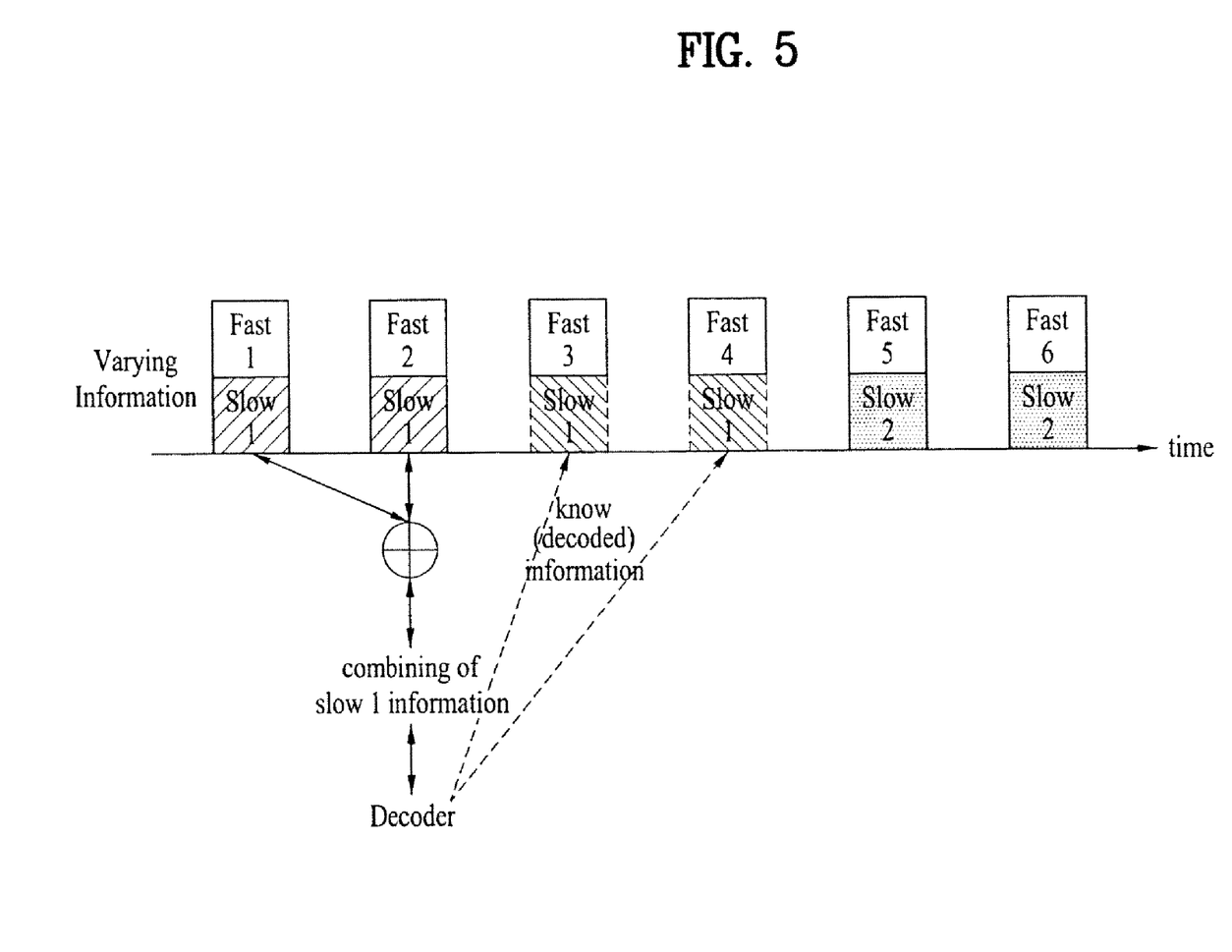
FIG. 5 is a diagram for explaining a method of obtaining information by receiving the information varying with a slow period repeatedly prescribed times and then combining the received informations according to one embodiment of the present invention.

FIG. 5 is a diagram for explaining a method of obtaining information by receiving the corresponding information varying with a slow period repeatedly prescribed times and then combining the received informations according to one embodiment of the present invention.

Referring to FIG. 5, slow varying information is received twice. The received informations are combined together and then decoded. Yet, it is apparent to those skilled in the art that the repeated reception count for raising reliability can be set variously to meet a requirement for a system. The combination of the repeatedly received informations can be determined in a manner of a hard or soft decision of each information value by comparing a plurality of the received informations. For simple example, a value of a specific part of odd received informations can be set to a value indicated by most frequently received information. Alternatively, a random combining method for raising reliability of received information is available as well as the above-mentioned example.

Meanwhile, after decoding of the slow varying information repeatedly received twice in FIG. 5, a receiving side is facilitated to decode slow varying information in a next received signal in a manner of by performing unmasking on the latter slow varying information using the corresponding decoding result.

The method of using the slow varying information by the combination through the repeated receptions according to the embodiment shown in FIG. 5 may be preferable for a case that the slow varying information is very important information. For instance, if a receiver remote from a transmitting side receives a signal, it may happen that any information is difficult to be decoded at a time with considerable reliability. If decoding reliability of fast varying information is supposed to be higher than that of slow varying information, it is more preferable that a receiving side obtains the corresponding information by repeatedly receiving the slow varying information and then combining the received informations.

Meanwhile, the above-mentioned embodiment in association with FIG. 5 may be disadvantageous in that the fast varying information is undecodable while waiting for the combination of the slow varying information. Yet, since the present invention assumes a case that both of the slow varying information and the fast varying information should co-exit for a complete meaning, the method of raising reception reliability of the slow varying information may be advantageous despite the sacrifice of the fast varying information in part. Yet, to overcome the above problem, according to one preferred embodiment of the present invention, it is proposed that reliability of slow varying information is raised by giving an offset amounting to a predetermined time in interpretation of slow varying information in a manner of avoiding an inconvenience for an interpretation linked with fast varying information.

Figure 6:
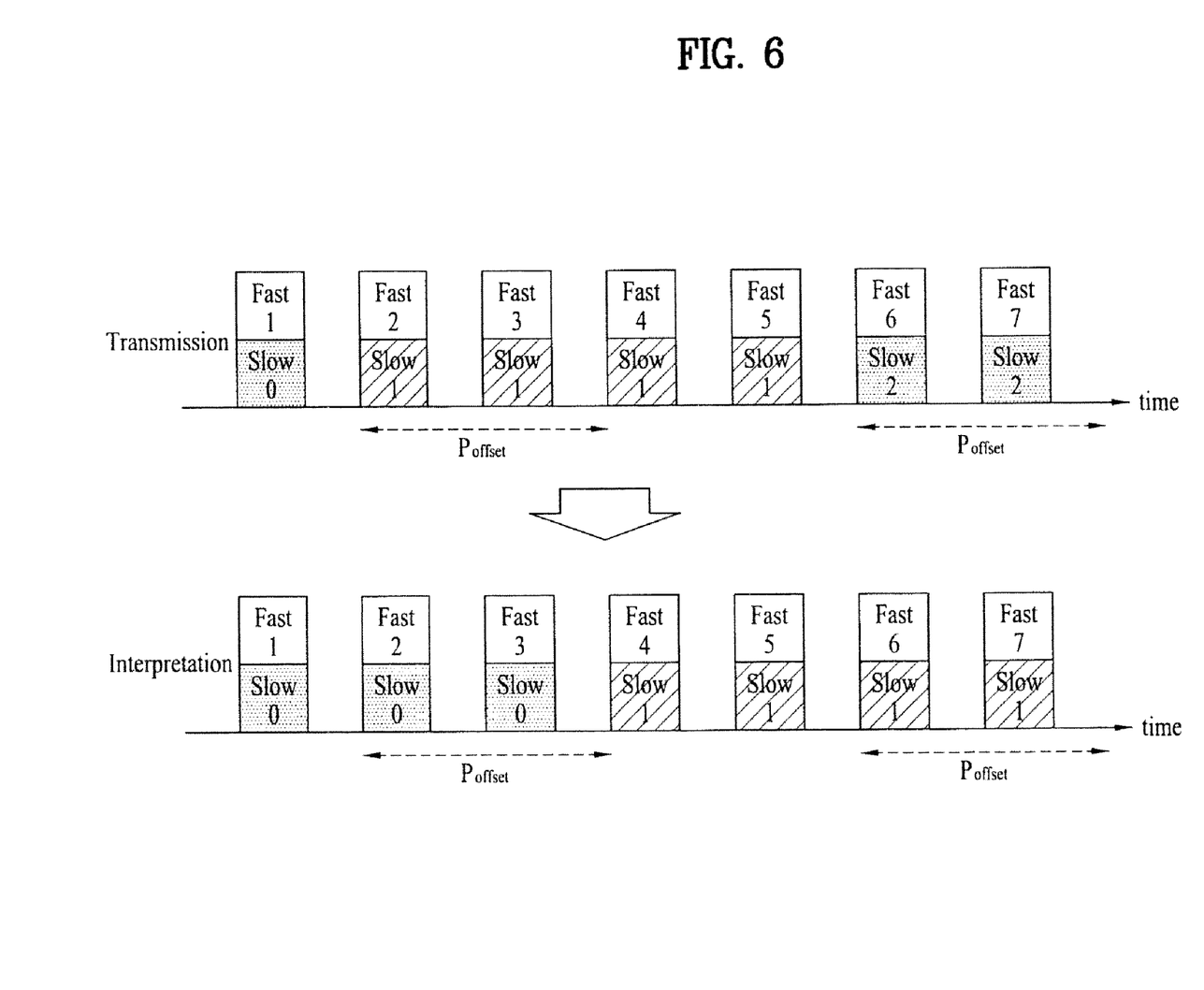
FIG. 6 is a diagram for explaining an interpretation method according to one embodiment of the present invention, in which a predetermined time offset is set for slow varying information when a receiving side performs linked interpretation of fast varying information and the slow varying information.

FIG. 6 is a diagram for explaining an interpretation method according to one embodiment of the present invention, in which a predetermined time offset is set for slow varying information when a receiving side performs a linked interpretation of fast varying information and the slow varying information.

Assume that slow varying information is used in a manner that information received repeatedly for a prescribed count is combined together for reliability enhancement. For this, assume that repeated receptions amounting to $P_{offset}$ are necessary. If so, the slow varying information is actually used after it is repeated as many as $P_{offset}$.

In the linked interpretation of slow varying information and fast varying information, the present embodiment proposes that a time offset amounting to $P_{offset}$ is given to the slow varying information. In particular, in case of performing the linked interpretation of slow varying information and fast varying information, even if both of the informations are simultaneously transmitted, the present embodiment proposes that the slow varying information is actually applied after duration of $P_{offset}$ behind the fast varying information and also proposes that the slow varying information previously received and decoded is used until the actual application of the slow varying information.

Referring to FIG. 6, although both slow varying information Slow 1 and fast varying information Fast 2 are transmitted together, since transmission repetition of 'Slow 1' is prior to the repetition amounting to $P_{offset}$, an actual interpretation is performed in a manner that the slow varying information is actually interpreted in link with 'Fast 2' using the previously transmitted 'Slow 0'.

Subsequently, after the slow varying information Slow 1 has been repeatedly received as many as $P_{offset}$, 'Slow 1' is actually applied to the link with the fast varying information. The corresponding timing point corresponds to a timing point of transmitting 'Fast 4' and 'Slow 1'.

INDUSTRIAL APPLICABILITY

According to the above-mentioned various embodiments of the present invention, informations in various types are efficiently coded and then transmitted. A receiving side performs decoding on the received information quickly by maintaining high reliability. Therefore, the present invention is applicable to various mobile communication systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for decoding information at a receiving side, the method comprising:
    receiving, at a first reception period, encoded first type information that varies with a first period and encoded second type information that varies with a second period, the second period shorter than the first period;
    decoding, via a first decoding process, the encoded first type information and encoded second type information;
    receiving, at a second reception period that is a predetermined time after the first reception period, the encoded first type information and encoded second type information; and
    decoding, via a second decoding process, the encoded second type information received at the second reception period; and
    decoding, via the second decoding process, the encoded first type information received at the second reception period only when the predetermined time is greater than the first period.

2. The method of claim 1, wherein:
    the first type information and second type information are encoded at a transmitting side by a prescribed block coding scheme; and
    encoding the first type information and second type information comprises sequentially encoding the first type information and second type information to correspond to a left basis sequence of a code generation matrix for the prescribed block coding scheme in order of the second type information to the first type information.

3. The method of claim 2, wherein:
    the code generation matrix is characterized in that a minimum Hamming distance of the encoded first type information and encoded second type information is inversely proportional to a length of the encoded first type information and encoded second type information such that the minimum Hamming distance of the encoded first type information having a first length is equal to or greater than the minimum Hamming distance of the encoded second type information having a second length
    when the first length of the encoded first type information is less than the second length of the encoded second type information.

4. The method of claim 1, further comprising:
    repeating, for a threshold count, the reception of the encoded first type information and encoded second type information at the first reception period and the decoding of the encoded first type information and encoded second type information via the first decoding process,
    wherein results of repeated decoding of the encoded first type information via the first decoding process for the threshold count are utilized in the second decoding process when the predetermined time is less than the first period.

5. The method of claim 4, further comprising:
interpreting a result of decoding the encoded first type information via the first or second decoding process and a result of decoding the encoded second type information via the first or second decoding process by linking the result of decoding the encoded first type information via the first or second decoding process with the result of decoding the encoded second type information via the first or second decoding process,
wherein the result of decoding the encoded first type information via the first or second decoding process is interpreted with a prescribed offset.

6. The method of claim 5, wherein the prescribed offset corresponds to an amount of time accrued while receiving the encoded first type information and encoded second type information at the first reception period and decoding the encoded first type information and encoded second type information via the first decoding process for the threshold count.

7. A method for transmitting information via a transmitting side, the method comprising:
concatenating first type information that varies with a first period and second type information that varies with a second period into a single information bitstream, the second period shorter than the first period;
encoding the single information bitstream by a prescribed coding scheme to generate a codeword; and
transmitting the codeword to a receiving side,
wherein the prescribed coding scheme is characterized in that a minimum Hamming distance of the codeword is inversely proportional to a length of the codeword such that the minimum Hamming distance of the codeword having a first length is equal to or greater than the minimum Hamming distance of the codeword having a second length
when the first length of the codeword is less than the second length of the codeword.

8. The method of claim 7, wherein:
the prescribed coding scheme comprises a block coding scheme in which the single information bitstream sequentially corresponds to a left basis sequence of a code generation matrix for the prescribed block coding scheme in order of a bit corresponding to the second type information to a bit corresponding to the first type information.

9. The method of claim 7, further comprising:
utilizing a time required to concatenate the first type information and second type information as a reference time;
encoding the second type information by using information generated during the reference time; and
generating the first type information by encoding the first type information with a prescribed offset from the reference time, the first type information generated prior to a previous corresponding time.

* * * * *